(12) United States Patent
Sakae et al.

(10) Patent No.: US 8,903,977 B2
(45) Date of Patent: Dec. 2, 2014

(54) DATA SUPPLY APPARATUS, SYSTEM, AND METHOD FOR SUPPLYING DATA TO HIERARCHICALLY-CONNECTED DATA SUPPLY DESTINATIONS

(75) Inventors: Yoshiaki Sakae, Tokyo (JP); Kinichi Sugimoto, Tokyo (JP); Toshiya Okabe, Tokyo (JP); Yasuo Itabashi, Tokyo (JP); Takayuki Shizuno, Tokyo (JP); Masumi Ichien, Tokyo (JP)

(73) Assignee: NEC Corporation, Tokyo (JP)

( * ) Notice: Subject to any disclaimer, the term of this patent is extended or adjusted under 35 U.S.C. 154(b) by 288 days.

(21) Appl. No.: 13/392,079

(22) PCT Filed: Aug. 6, 2010

(86) PCT No.: PCT/JP2010/063395
§ 371 (c)(1),
(2), (4) Date: Feb. 23, 2012

(87) PCT Pub. No.: WO2011/027648
PCT Pub. Date: Mar. 10, 2011

(65) Prior Publication Data
US 2012/0158939 A1 Jun. 21, 2012

(30) Foreign Application Priority Data
Sep. 2, 2009 (JP) .................................. 2009-202576

(51) Int. Cl.
 *G06F 15/173* (2006.01)
 *G06F 15/16* (2006.01)
 *H04N 21/218* (2011.01)

(52) U.S. Cl.
CPC .............................. *H04N 21/21815* (2013.01)
USPC ............ 709/223; 709/201; 709/202; 709/217

(58) Field of Classification Search
USPC .......... 709/202–203, 217–219, 223–224, 201
See application file for complete search history.

(56) References Cited

U.S. PATENT DOCUMENTS 6,067,565 A * 5/2000 Horvitz ......................... 709/223
6,182,133 B1 * 1/2001 Horvitz ......................... 709/223
6,292,828 B1 * 9/2001 Williams ....................... 709/218

(Continued)

FOREIGN PATENT DOCUMENTS

JP 2004-005309 A 1/2004
JP 2004-246632 A 9/2004

(Continued)

OTHER PUBLICATIONS

Japanese Office Action dated Sep. 2, 2014 with a Partial English Translation thereof.

*Primary Examiner* — Bharat N Barot
(74) *Attorney, Agent, or Firm* — McGinn IP Law Group, PLLC (57) ABSTRACT

Provided is a data supply apparatus including a transmission device that sends data to another data supply apparatus; a reception device that receives data from another data supply apparatus; a data storing device that stores data in a storage device; and a data storage determination device that determines whether or not the received data should be stored in the storage device, based on a predetermined supply probability. In a typical example, the reception device receives the data to which supply probability information which indicates the supply probability has been appended; and the data storage determination device determines whether or not the received data should be stored in the storage device, based on the supply probability indicated by the supply probability information.

20 Claims, 8 Drawing Sheets

(56) References Cited

U.S. PATENT DOCUMENTS

| | | | |
|---|---|---|---|
| 7,627,617 B2* | 12/2009 | Kavuri et al. | 709/217 |
| 7,644,150 B1* | 1/2010 | Nucci et al. | 709/223 |
| 2002/0029282 A1 | 3/2002 | Buddhikot et al. | |
| 2004/0064832 A1 | 4/2004 | Tsukidate et al. | |
| 2004/0230996 A1 | 11/2004 | Takeuchi et al. | |
| 2010/0094921 A1* | 4/2010 | Roy et al. | 709/201 |
| 2012/0219230 A1* | 8/2012 | Sasai et al. | 382/233 |

FOREIGN PATENT DOCUMENTS

| | | |
|---|---|---|
| JP | 2005-070987 A | 3/2005 |
| JP | 2006-050479 A | 2/2006 |

* cited by examiner

SCALING FACTOR

DATA SUPPLY APPARATUS, SYSTEM, AND METHOD FOR SUPPLYING DATA TO HIERARCHICALLY-CONNECTED DATA SUPPLY DESTINATIONS

TECHNICAL FIELD

The present invention relates to a data supply apparatus, a data supply system, and a data supply method, and a computer program, in particular, to those preferably applied to a widely distributed system, by which when supplying data to data supply destinations which are hierarchically connected on a logical network, a data supply instruction can be simplified, an automatic data supply which meets a demand according to increase or decrease in the data supply destinations can be performed, and characteristics such as geographical or temporal data use tendency can be reflected in supply results.

Priority is claimed on Japanese Patent Application No. 2009-202576, filed Sep. 2, 2009, the contents of which are incorporated herein by reference.

BACKGROUND ART

Figure 11:
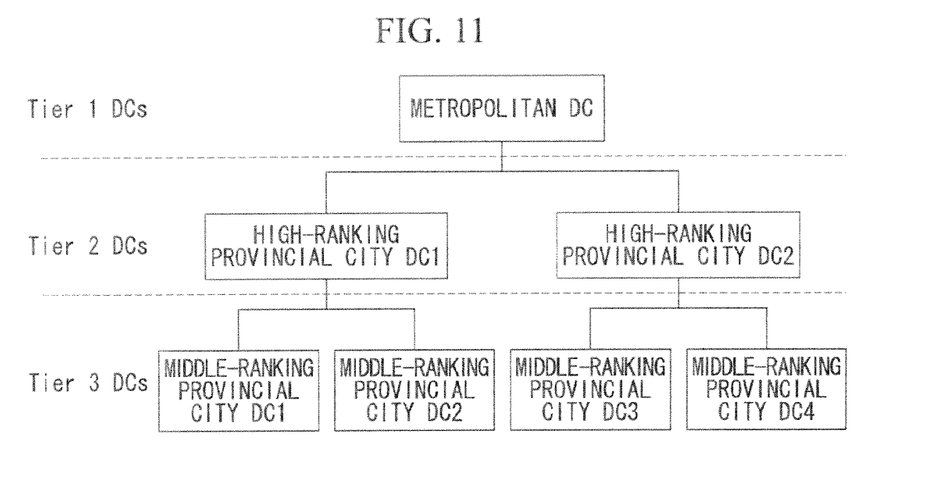
FIG. 11 is a system configuration diagram showing an example of an existing data supply system preferably applied to a widely distributed system.

FIG. 11 is a diagram showing an example of an existing data supply system preferably applied to a widely distributed system. The data supply system (CDN: Contents Delivery Network) of FIG. 11 has a hierarchical logical tree structure corresponding to the number of users or a geographical range covered by the system, and performs appropriate content supply in response to each audience request from users. Accordingly, it is possible to implement high speed responsibility, efficient network usage, and the like.

The above supply means a process of transferring a content to another apparatus, and making the transferred content into a storage device of the relevant apparatus. In the following descriptions, the term "supply" is used to have such a meaning.

The data supply system of FIG. 11 has a three-tier (hierarchical) structure constituting of DCs (Data Centers) from a DC arranged in a metropolitan area to DCs arranged in middle-ranking provincial cities. However, the manner of forming a hierarchy and the number of tiers are not limited to those in the example.

Generally, based on the number of users covered by the relevant system, the size of each DC has a general relationship "Tier 1>Tier 2>Tier 3", that is, the higher the tier, the larger the size of each DC belonging to the relevant tier. Additionally, the capacity for contents storable in each DC has a similar relationship.

In such a case, each DC in Tier 3 stores part of contents stored in a DC belonging to Tier 1 or Tier 2.

In order to optimize the data supply system with respect to total responsibility, network usage efficiency, or the like, it is important to appropriately determine which DC each content will be supplied to, within a specific cost. That has been a problem to be solved.

For example, if users, who are connected to a middle-ranking provincial city DC1 and a high-ranking provincial city DC1, frequently access content A which is stored only in a metropolitan DC, then content A is provided from the metropolitan DC to the high-ranking provincial city DC1 in response to each access from the users who are connected to the high-ranking provincial city DC1.

Additionally, in response to each access from the users who are connected to the middle-ranking provincial city DC1, content A is provided from the metropolitan DC to the relevant high-ranking provincial city DC1, and is further provided from the high-ranking provincial city DC1 to the relevant middle-ranking provincial city DC1.

On the other hand, if content A has been supplied to the high-ranking provincial city DC1 which now stores content A, then content A can be directly supplied to a user, who is connected to the high-ranking provincial city DC1 and accesses content A, without receiving the relevant content from another DC. Additionally, for the access from a user connected to the middle-ranking provincial city DC1, content A is provided from the high-ranking provincial city DC1 to the middle-ranking provincial city DC1.

That is, in comparison with a case in that only the metropolitan DC stores content A, a higher level of network usage efficiency can be obtained. However, since there is the above-described general relationship such that the lower the tier, the smaller the size of each DC belonging to the relevant tier, it is not preferable to supply all contents to all DCs.

Figure 12:
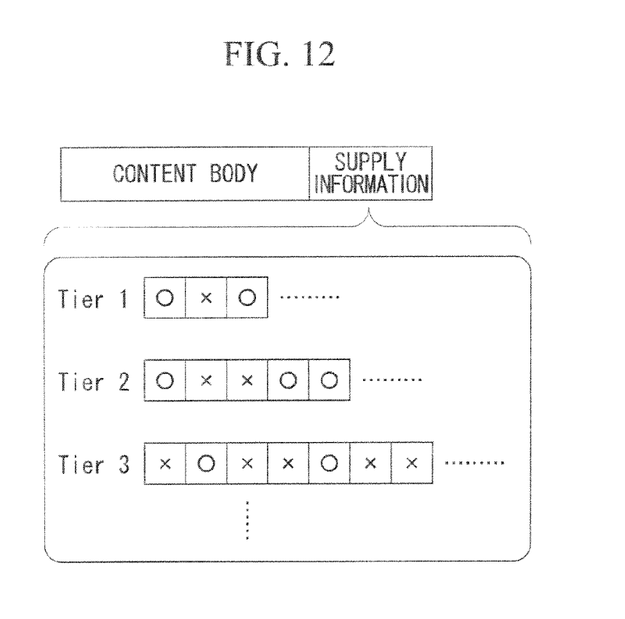
FIG. 12 is a diagram showing a known method for clearly designating DCs (data centers) to which each content should be supplied.

FIG. 12 is a diagram showing a known method for clearly designating DCs to which each content should be supplied.

In a simple approach for the content supply designation (see FIG. 12), DCs to which each content should be supplied may be clearly designated. However, this method cannot solve the following problems.

(1) Since it is necessary to determine for each DC whether or not content supply is performed, a considerable amount of cost occurs for the relevant computation.

(2) Since whether or not content supply is performed is clearly designated for each DC, an additional process to handle the increase or decrease in DCs must be implemented.

(3) Since the content supply information is statically designated, it is difficult to perform appropriate content supply in response to each demand for contents, for example, to supply a content to DCs belonging to a region which frequently accesses the content.

(4) Since information such as content viewing characteristics is not reflected in the relevant content supply designation method, the supply destination must be examined or controlled for each content. In addition, reexamination may sometimes be necessary.

Systems for solving the above problems have been developed, and the following Patent Documents disclose such a system.

For example, Patent Document 1 discloses a system configured by adding a distribution destination information DB to an existing content distribution system. In the configured system, relevant contents are distributed to terminals registered in the distribution destination information DB, based on a prepared distribution schedule and distribution conditions.

As another example, Patent Document 2 discloses a technique for a data supply system, in which dynamic and optimum content resupply to an edge server, from which a user terminal device directly reads a content, is performed based on user's viewing records, thereby maintaining desired service quality and implementing efficient system operation.

PRIOR ART DOCUMENT

Patent Document

Patent Document 1: Japanese Unexamined Patent Application, First Publication No. 2006-50479.
Patent Document 2: Japanese Unexamined Patent Application, First Publication No. 2004-5309.

DISCLOSURE OF INVENTION

Problem to be Solved by the Invention

The conventional content distribution systems shown in the BACKGROUND ART has the following problems, as described above.

In the first problem, since it is necessary to perform a computation to determine for each supply spot (supplier) whether or not content supply is performed, and also necessary to clearly designate for each supply destination, the relevant computation for determining the content supply destination requires a considerable amount of cost. Although the determination of the content supply destination may be manually performed based on personal experience, such determination requires a complex manual designation of the content supply destination.

In the second problem, since it is necessary to clearly designate the content supply destination, the increase or decrease of the content supply destinations cannot be easily handled.

In the third problem, since the content supply information is statically designated, a dynamic variation in demand for contents cannot be handled, so that appropriate data supply suited for such demand cannot be performed.

In the fourth problem, since information about use tendency of each content cannot be considered in the relevant content supply designation method, the supply destination must be examined or controlled for each content.

In the content distribution system disclosed in the above-described Patent Document 1, it is assumed, as shown in the document, that information is distributed over known destinations within a relatively limited range (e.g., within an organization). Therefore, it is necessary to designate, for each content, the type of the terminal device as each destination, and also to generate a distribution schedule for each terminal device type. If such a system is applied to a large-scaled content distribution system used by end users as the general public, a problem for scalability of the system may occur.

In the content distribution system disclosed in the above-described Patent Document 2, a user's viewing record is stored for each content, and stored information is analyzed so as to determine resupply of the relevant data. Such a system causes other problems about the scalability for viewing record storage and management with respect to the number of contents, and the scalability of increases in the amount of computation performed in the analysis for information about the number of contents.

In the above explanation, for easy understanding, the term "content", which is generally used so as to indicate video data or voice data, is used to indicate an object handled in the relevant system. However, the present invention can be applied, not only to contents, but also to general data.

In light of the above circumstances, an object of the present invention is to provide a data supply apparatus, a data supply system, and a data supply method, and a computer program, which are applied to a widely distributed system and can reduce the cost required for the computation to determine each data supply destination.

Another object of the present invention is to provide a data supply apparatus, a data supply system, and a data supply method, and a computer program, which are applied to a widely distributed system and can easily handle the increase or decrease of the data supply destinations.

Another object of the present invention is to provide a data supply apparatus, a data supply system, and a data supply method, and a computer program, which are applied to a widely distributed system and can implement automatic data supply in response to a variation in demand for relevant data.

Another object of the present invention is to provide a data supply apparatus, a data supply system, and a data supply method, and a computer program, which are applied to a widely distributed system and can implement performance (for responsibility, network usage efficiency, and the like) of a certain desired level even without examining or controlling the data supplier for each data.

Means for Solving the Problem

The present invention was made to solve the above problems, and provides a data supply apparatus comprising:

a transmission device that sends data to another data supply apparatus;

a reception device that receives data from another data supply apparatus;

a data storing device that stores data in a storage device; and a data storage determination device that determines whether or not the received data should be stored in the storage device, based on a predetermined supply probability.

The present invention also provides a data supply system which includes the above data supply apparatus as a constituent of the system.

The present invention also provides a data supply method comprising:

a transmission step that sends data to an apparatus;

a reception step that receives data from an apparatus;

a data storing step that stores data in a storage device; and a data storage determination step that determines whether or not the received data should be stored in the storage device, based on a supply probability appended to a body of the received data.

The present invention also provides a computer program for controlling a data supply apparatus, the program comprising:

a transmission step that sends data to another data supply apparatus;

a reception step that receives data from another data supply apparatus;

a data storing step that stores data in a storage device; and a data storage determination step that determines whether or not the received data should be stored in the storage device, based on a supply probability appended to a body of the received data.

Effect of the Invention

As described above, in accordance with the data supply apparatus of the present invention, when receiving data from another data supply apparatus, whether or not the received data is to be stored in a storage device is determined based on a predetermined supply probability. Therefore, it is unnecessary to set, for each data, whether or not the data can be stored, and the relevant advisability is determined by a simple computation, thereby reducing the computation cost required for data provision or designation of a destination in which data is stored.

Additionally, in the data supply system of the present invention, when a supply probability is assigned to each tier (for the data supply apparatuses) in advance, it is unnecessary to assign a supply probability to each data supply apparatus, thereby easily handling the increase or decrease of content supply destinations.

Also in the present invention, it is determined, for each data access, whether or not the data can be stored in a data supply apparatus based on a relevant supply probability. Therefore, it is frequently determined that data which has been frequently accessed is to be stored, so that the higher the access frequency of data, the higher the probability that the data is stored in the data supply apparatus. Accordingly, it is possible to perform appropriate data supply in response to a demand for contents.

MODE FOR CARRYING OUT the INVENTION

The data supply apparatus of the present invention is preferably applied to widely distributed systems, and provides a logical connection relationship which employs a tree hierarchy. The probability of data supply to data supply apparatuses in each tier is contained in each content (or data) itself, each data supply apparatus, or a supply probability providing apparatus. In addition, each data supply apparatus may have a data storage determination unit and a data storage unit. When data is transferred, the probability of supplying the data is determined in accordance with each tier of the system, and the data is stored in the data storage unit of each present apparatus based on the supply probability.

Below, the data supply apparatus, the data supply system, and the data supply method of the present invention will be explained in detail using embodiments from first to third embodiments, with reference to the drawings.

First Embodiment

Figure 1:
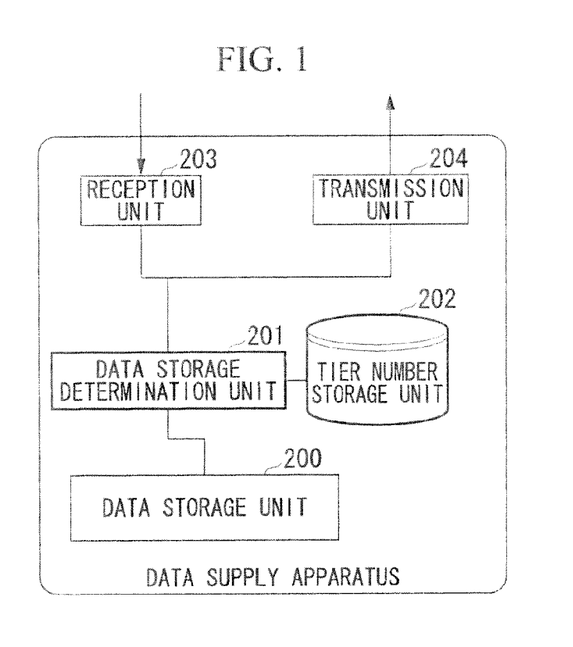
FIG. 1 is a block diagram showing the general structure of a data supply apparatus as the first embodiment of the present invention.
Figure 2:
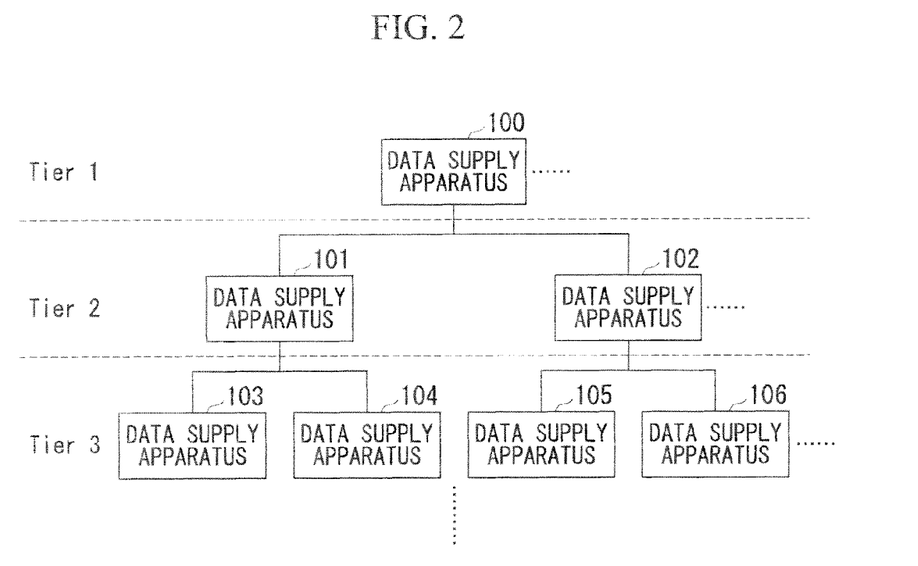
FIG. 2 shows an example of a data supply system in which data supply apparatuses for the first embodiment are arranged.

FIG. 1 is a block diagram showing the general structure of a data supply apparatus as the first embodiment of the present invention. FIG. 2 shows an example of a data supply system in which data supply apparatuses for the first embodiment are arranged.

The data supply apparatus shown in FIG. 1 can be used to configure a widely distributed data supply apparatus as shown in FIG. 2, and has a data storage unit 200 (e.g., memory or disk) functioning as a storage and primary structural elements which are a data storage determination unit 201 that performs a data storage determination, a tier number storage unit 202 that stores tier number data which is used in the data storage determination, a reception unit 203 that performs data reception, and a transmission unit 204 that performs data transmission.

In the data supply system shown in FIG. 2, reference numerals 100, 101, 102, . . . , 106, . . . each indicate a data supply apparatus belonging to the present embodiment (below, each data supply apparatus in FIG. 2 has structural elements to which reference numerals identical to those in the data supply apparatus 100 of FIG. 1 are applied).

As a physical structure for actual systems, the data storage unit 200 may be an independent external storage device (such a structure is employed in a specific example explained later).

Additionally, as shown in the widely distributed system of FIG. 2, the data supply apparatuses in the present embodiment are arranged to form a logical tree (including data supply apparatuses 100 to 106) having a hierarchical structure on such a widely distributed network.

The relevant hierarchical structure employs numbering, for example, Tier 1, Tier 2, Tier 3, . . . as tier numbers assigned starting from the highest tier of the tree, based on natural numbers. Essentially, if each tier can be identified, the numbering method therefor is not limited to the above method based on natural numbers. The above-described tier number storage unit 202 stores such hierarchical number data.

In addition, although the tree shown in FIG. 2 has two branches, the number of branches (children) are not limited to 2. Furthermore, if hierarchical numbering is possible, a graph structure which can apply a plurality of parents to a child may be employed instead of a tree structure.

Figure 3:
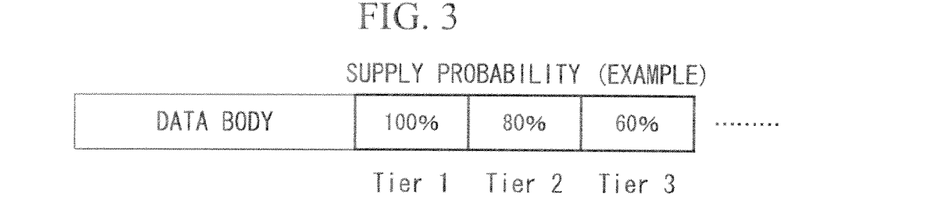
FIG. 3 is a diagram showing a data structure which indicates data supply probability corresponding to each tier.

FIG. 3 is a diagram showing a data structure which indicates data supply probability corresponding to each tier.

In the present embodiment, when each data supply apparatus receives data provided from another data supply apparatus, the present apparatus determines whether or not the received data is stored in the present apparatus based on supply probability information (see FIG. 3) appended to the supplied data. Here, the supply probability is a probability used when the apparatus which received the relevant data determines whether or not the data should be stored in the present apparatus.

The supply probability information shown in FIG. 3 may be predetermined in correspondence to each tier on the logical network (detailed explanation therefor will be provided later).

In accordance with the procedure of the present embodiment, each data is stored in a data supply apparatus which has frequently accessed the data or a data supply apparatus which is present on a transfer route for the data, with a relatively high probability.

In contrast, the probability that data, which has low importance or has not been frequently accessed, is stored in each relevant data supply apparatus is low.

The supply probability information may be stored in a front part (e.g., header) of data, or in a middle part thereof. In another example, the supply probability information may be stored separately from the data body, that is, as file management metadata. That is, the supply probability information may be stored in a manner such that the relationship between the relevant information and the corresponding data is clearly indicated.

Next, the function of the data supply apparatus in the present embodiment will be explained with reference to FIGS. 1 and 2.

In a widely distributed data supply system as shown in FIG. 2, it is assumed that a data supply apparatus now requires data which is not stored in the present apparatus (e.g., when receiving a data provision request for the relevant data from a user terminal connected to the present apparatus), and will receive the relevant data from another data supply apparatus. A specific example will be shown, in which data is transferred from the data supply apparatus 102 to the data supply apparatus 105 in FIG. 2.

First, the data supply apparatus 102 retrieves the relevant data from the data storage unit 200 (see FIG. 1), and sends it to the data supply apparatus 105 via the transmission unit 204.

Here, the supply probability information (see FIG. 3) has been appended to the data stored in the 200. When providing the data to the data supply apparatus 105, the supply probability information can be appended to the data via the data storage determination unit 201 by means of user's operation of an input device (not shown).

Next, the reception unit 203 of the data supply apparatus 105 receives the transmitted data, and the data storage determination unit 201 of the data supply apparatus 105 determines whether or not the data will be stored into the data storage unit 200 based on the supply probability information (see FIG. 3) appended to the data and the tier number (here, "Tier 3") of the present apparatus, which is stored in the tier number storage unit 202.

The determination of whether or not the data will be stored may be performed as follows.

First, the data storage determination unit 201 uses the supply probability information so as to retrieve the supply probability associated with the tier number of the present apparatus, that is, retrieves a supply probability of 60% associated with Tier 3.

The data storage determination unit 201 then generates random numbers from 1 to 100, and compares each generated random number with the supply probability. If the generated random number is smaller than or equal to the supply probability, it is determined that the relevant data is to be stored in the data storage unit 200. If the generated random number exceeds the supply probability, it is determined that the relevant data is not to be stored in the data storage unit 200.

The method of data storage determination is not limited above. For example, if the supply probability can be set up to the first decimal place, random numbers from 1 to 1000 may be generated, and the relevant determination may be performed by comparing each generated random number with a value ten times as high as the value of the supply probability.

When it is determined that the relevant data is to be stored in the data storage unit 200, the data storage determination unit 201 stores the data into the data storage unit 200. When it is determined that the relevant data is not to be stored in the data storage unit 200, the data storage determination unit 201 performs nothing.

After that, as the need arises, the data supply apparatus 105 updates the supply probability appended to the relevant data, and transfers the data to an external apparatus via the transmission unit 204.

Figure 4:
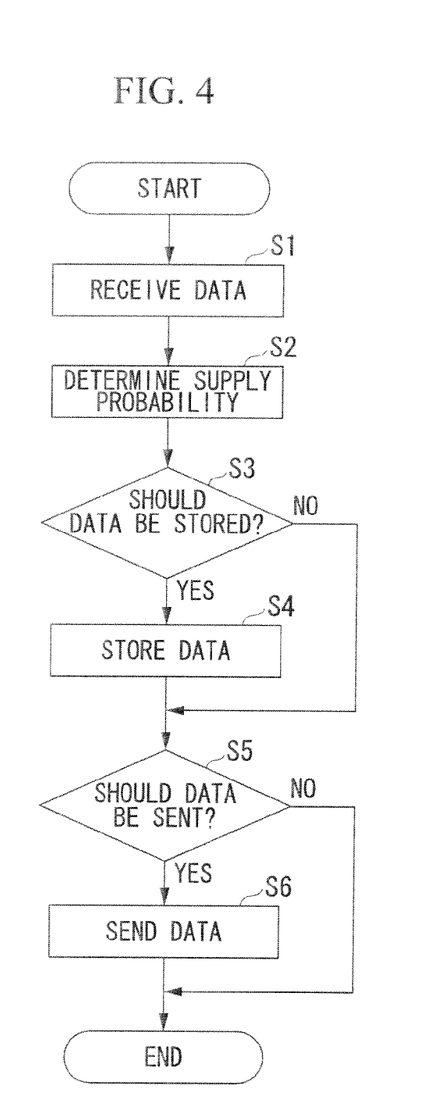
FIG. 4 is a flowchart showing an operation of the data supply apparatus in the first embodiment, performed when receiving data.

FIG. 4 is a flowchart showing an operation of the data supply apparatus in the first embodiment, performed when receiving data.

Below, the relevant operation of the data supply apparatus in the first embodiment will be explained by using the flowchart of FIG. 4 while referring to FIGS. 1 to 3.

In the following explanation, although reference numeral 100 is conveniently assigned to the target data supply apparatus for the explanation, the other data supply apparatuses each perform similar operation.

Step S1: In the first step S1, the data supply apparatus 100 receives data transferred from any of the other data supply apparatuses (having reference numerals 101, 102, . . . , 106, . . . ) via the reception unit 203.

Step S2: In the next step S2, the data supply apparatus 100 determines the data supply probability of the present apparatus for the transferred data, based on the tier number of the present apparatus, which is stored in the tier number storage unit 202, and the supply probabilities (see FIG. 3) appended to the relevant data.

Step S3: In the next step S3, the data supply apparatus 100 determined whether or not the data transferred to the present apparatus is to be stored in the data storage unit 200, based on the determined data supply probability.

Step S4: In the next step S4, the data supply apparatus 100 stores the transferred data into the data storage unit 200.

Step S5: In the next step S5, the data supply apparatus 100 determines whether or not transfer of the relevant data to another data supply apparatus or an end user who uses the data (and thus is accessing the present apparatus via a network) is necessary.

If such retransfer of data is necessary, the operation proceeds to step S6. If the retransfer of data is unnecessary, the operation is immediately terminated.

Step S6: In the next step S6, the data supply apparatus 100 sends the data to said other data supply apparatus or said end user, via the transmission unit 204.

In the data supply apparatus, data supply method, and data supply system in accordance with the present embodiment, the supply probability is used as a parameter for making the data receiving side determine whether or not the transmitted data should be stored in a storage unit on the receiving side.

That is, a data supply apparatus on the data sending side (i) predetermines the supply probability based on the degree of importance for target data, which is associated with the tier (i.e., tier number in the present embodiment) to which a data supply apparatus as the destination of the data belongs on a logical network, and (ii) appends the determined supply probability to the body of the data in advance on the sending side.

Accordingly, designation of important data which should be stored onto the receiving side, can be easily performed on the sending side with low cost.

As described above, in the present embodiment, whether or not the transmitted data should be stored onto the receiving side is designated using a probability based on, not each data supply apparatus as the destination, but the tier to which the data supply apparatus as the destination belongs on a logical network. Therefore, as long as no increase in the number of the tiers occurs, an increase or decrease in the number of data supply destinations can be easily handled.

Additionally, since the supply probability is used in the data supply designation of the present embodiment, the followings are possible when determining the necessity of data transfer to another data supply apparatus (that is, determining whether or not the relevant data is to be supplied to another data supply apparatus).

(i) Regarding a data supply apparatus which has frequently accessed the relevant data, and a data supply apparatus which is present on a route for transferring the data, since each access causes the determination based on the supply probability, the data is consequently supplied to such apparatuses with a high probability, thereby implementing automatic data supply in accordance with demand for the relevant data.

(ii) Since the supply probability can be set in consideration of geographical or temporal data use tendency, or data use tendency for each content, it is possible to anticipate to obtain performance (for responsibility, network usage efficiency, and the like) of a certain desired level even without examining or controlling the data supplier with respect to each data.

Furthermore, the present embodiment can prevent inappropriate data storage onto the receiving side by appending a relatively low supply probability to the body of data which has relatively low importance or low anticipated frequency for future access.

In addition, when the data storage unit 200 has a limited capacity due to, for example, allocation control based on an URL (Least Recently Used) algorithm, a filtering function can also be anticipated as a secondary effect.

The reason for the above anticipation follows. If no data supply system based on the present embodiment is used, then each supplied data is stored into the data storage unit 200 for the present even when the data has low importance or low anticipated frequency for future access. Therefore, allocation control based on the URL algorithm may be executed depending on the used amount of the data storage unit 200, which may exclude data, which expectedly has a higher degree of importance or a higher frequency for future access in comparison with the newly stored data, from the relevant memory.

In contrast, using a data supply system based on the present embodiment can reduce a probability that data having low importance is stored, and thus the data supply system can function as a filter for the allocation control based on the URL algorithm so as to prevent inappropriate data storage.

Second Embodiment

Figure 5:
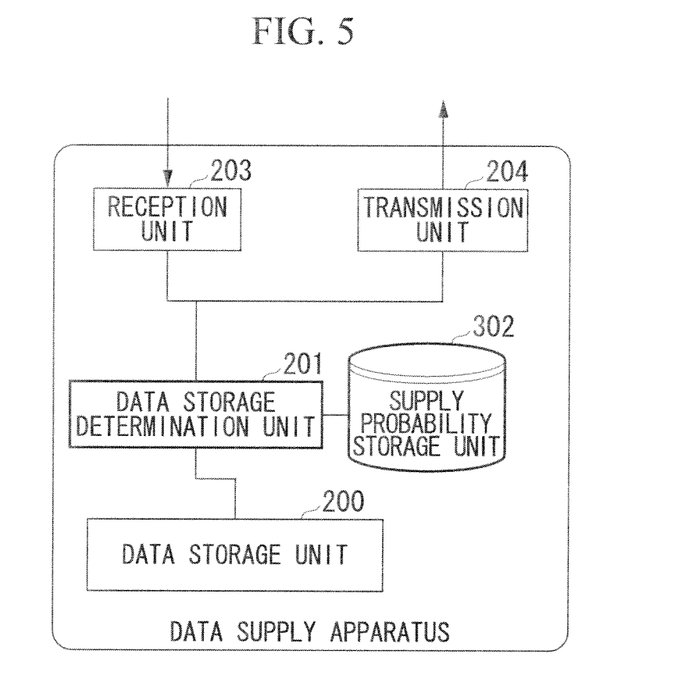
FIG. 5 is a block diagram showing the general structure of a data supply apparatus as the second embodiment of the present invention.

FIG. 5 is a block diagram showing the general structure of a data supply apparatus as the second embodiment of the present invention.

In the data supply apparatus shown in FIG. 5, the tier number storage unit 202 of the data supply apparatus in the first embodiment is replaced with a supply probability storage unit 302. The other structural elements are identical to those of the data supply apparatus in the first embodiment. Additionally, an example of the data supply system in which the data supply apparatuses of the present embodiment are arranged is similar to that shown in FIG. 2.

In the supply probability storage unit 302, a supply probability assigned to the tier to which the present apparatus belongs or supply probabilities assigned to all tiers are stored in advance.

Each supply probability stored in the supply probability storage unit 302 is not appended to the data body, but stored in the supply probability storage unit 302 (i.e., in the data supply apparatus) as described above.

In accordance to the above configuration, information appended to the data body is not supply probability information which indicates a supply probability for each tier number, but scaling factor information that indicates each scaring factor (applicable to all tiers).

The above scaling factor is a value used for controlling the supply probability for each data (such as a content). For example, when magnification is designated as the scaling factor, the supply probability for the data (such as a content) can be determined by multiplying the magnification by the supply probability stored in the relevant data supply apparatus.

Similar to the supply probability information of the first embodiment, the scaling factor information may be added in front of data or in the middle of the data, or may be added as separate data (i.e., as file management metadata) from the data body.

Figure 7:
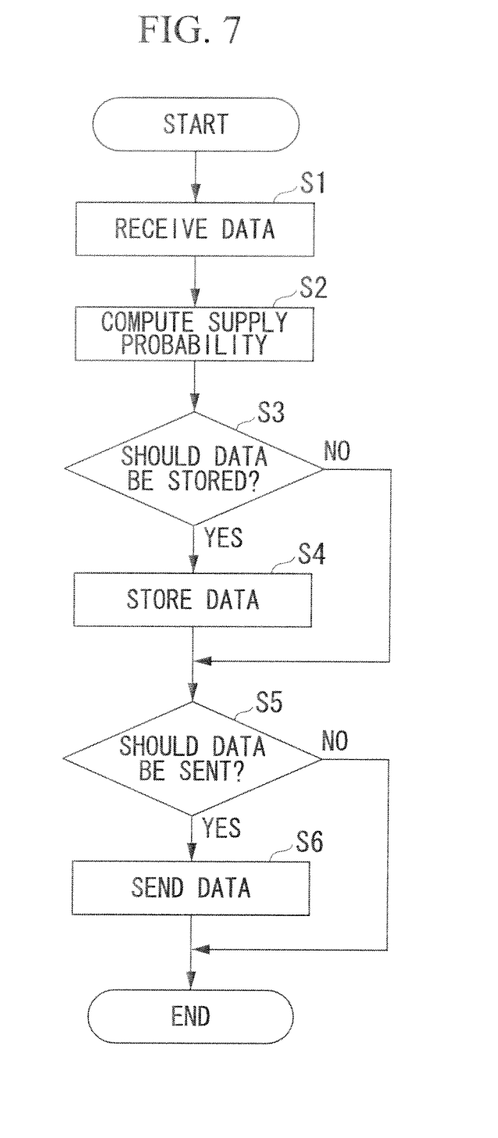
FIG. 7 is a flowchart showing an operation of the data supply apparatus in the second embodiment, performed when receiving data.

FIG. 7 is a flowchart showing an operation of the data supply apparatus in the second embodiment, performed when receiving data.

Figure 6:
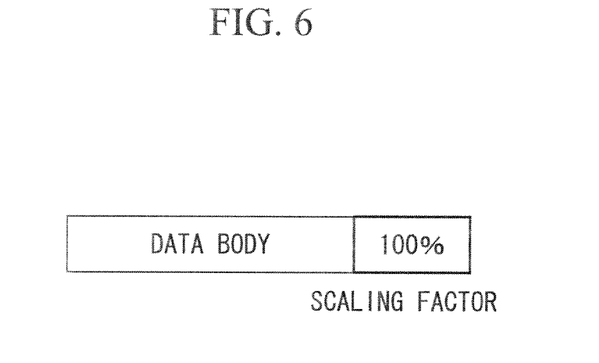
FIG. 6 is a diagram showing a data structure in which a scaling factor is appended to the data body.

Below, the relevant operation of the data supply apparatus in the second embodiment will be explained by using the flowchart of FIG. 7 while referring to FIGS. 5 and 6.

In the following explanation, although reference numeral 100 is conveniently assigned to the target data supply apparatus for the explanation, the other data supply apparatuses each perform similar operations.

Also in the following explanation, distinctive features in comparison with the operation of the data supply apparatus in the previously described first embodiment are mainly shown, where reference numerals assigned to each step and sentences in each block are basically identical to those in the flowchart of FIG. 4, where a part of the sentences is modified.

First, data transferred from another data supply apparatus is received by the reception unit 203 of the data supply apparatus shown in FIG. 5 (see step S1).

Next, the data supply probability for the relevant data is computed using the supply probability, which is assigned to the present apparatus and stored in the supply probability storage unit 302, and the scaling factor (see FIG. 6) appended to the data transferred from said other data supply apparatus (see step S2).

In a preferable example, the data supply probability for the relevant data is computed by multiplying the supply probability assigned to the present apparatus by the scaling factor.

Since the operation in the steps from S3 is identical to the operation (shown in the flowchart of FIG. 4) of the data supply apparatus in the first embodiment, explanations thereof are omitted here.

In the data supply apparatus of the present embodiment, the supply probability can be set, not for each data, but for each tier, or (one supply probability) for all tiers. Therefore, in addition to the effects obtained by the data supply apparatus of the first embodiment of the present invention, setting of the supply probability for each data can be omitted, thereby reducing the storage capacity required for such setting of the supply probability applied to each data body.

Third Embodiment

Figure 8:
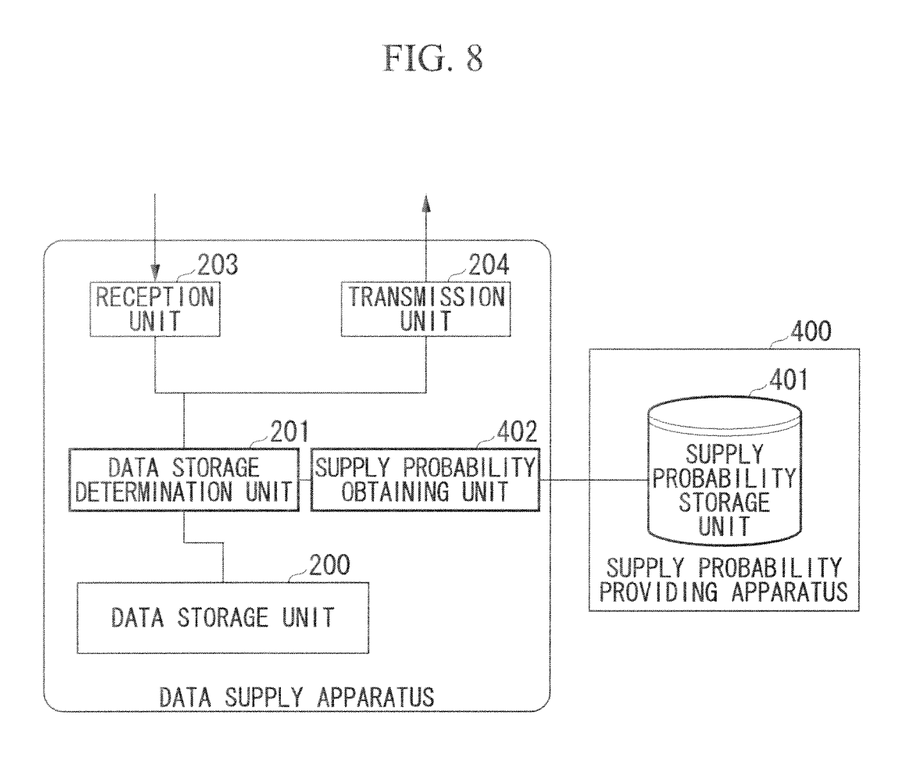
FIG. 8 is a block diagram showing the general structure of a data supply apparatus as the third embodiment of the present invention.

FIG. 8 is a block diagram showing the general structure of a data supply apparatus as the third embodiment of the present invention.

In the data supply apparatus shown in FIG. 8, a supply probability storage unit 401, corresponds to the supply probability storage unit 302 of the data supply apparatus (see FIG. 5) in the second embodiment of the present invention, is provided, not within the data supply apparatus, but in a supply probability providing apparatus 400 provided outside the data supply apparatus, where a supply probability obtaining unit 402 is provided in the data supply apparatus, and is positioned between the supply probability storage unit 401 and the data storage determination unit 201. The other structural elements are identical to those of the data supply apparatus in the second embodiment of the present invention.

Additionally, an example of the data supply system in which the data supply apparatuses of the present embodiment are arranged is similar to that shown in FIG. 2.

One supply probability providing apparatus 400 or a plurality of the supply probability providing apparatuses 400 may be provided for the entire system, where a known clustering technique for failure resistance or load distribution is used for providing a plurality of the apparatuses. In either case, the supply probability supplied to each data supply apparatus is common.

Figure 9:
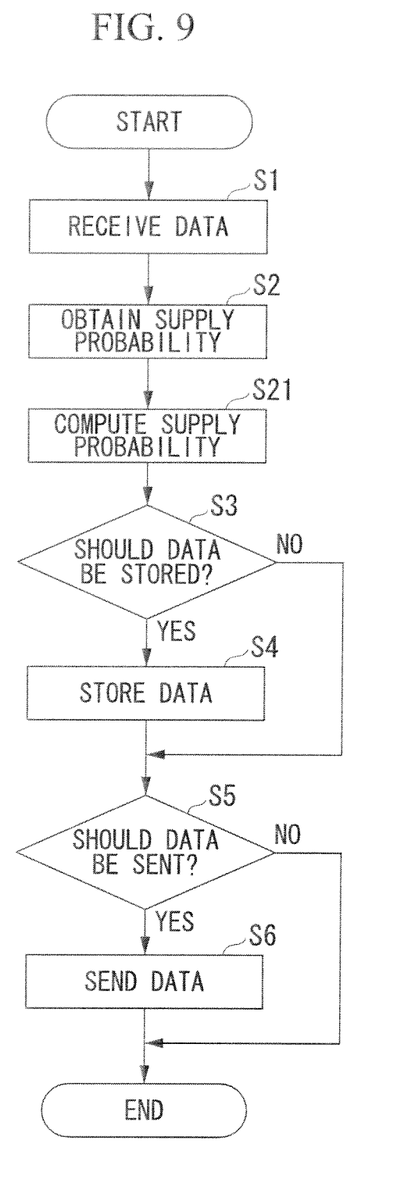
FIG. 9 is a flowchart showing an operation of the data supply apparatus in the third embodiment, performed when receiving data.

FIG. 9 is a flowchart showing an operation of the data supply apparatus in the third embodiment, performed when receiving data.

Below, the relevant operation of the data supply apparatus in the third embodiment will be explained by using the flowchart of FIG. 9 while referring to FIGS. 8 and 6.

In the following explanation, although reference numeral 100 is conveniently assigned to the target data supply apparatus for the explanation, the other data supply apparatuses each perform similar operations.

Also in the following explanation, distinctive features in comparison with the operation of the data supply apparatus in the previously described first embodiment are mainly shown, where reference numerals assigned to each step and sentences in each block are basically identical to those in the flowchart of FIG. 4, where a part of the sentences is modified.

First, data transferred from another data supply apparatus is received by the reception unit 203 of the data supply apparatus (see FIG. 8) (see step S1).

Next, the supply probability obtaining unit 402 obtains a supply probability for the present apparatus from the supply probability storage unit 401 in the supply probability providing apparatus 400 (see step S2).

The supply probability obtaining unit 402 then computes the data supply probability for the relevant data by using the obtained supply probability (assigned to the present apparatus) and the scaling factor (see FIG. 6) appended to the data (see step S21).

Since the operation in the steps from S3 is identical to the operation (shown in the flowchart of FIG. 7) of the data supply apparatus in the second embodiment, explanations thereof are omitted here.

In accordance with the data supply apparatus of the present embodiment, the supply probability providing apparatus 400, which operates outside the data supply apparatus (see FIG. 8) and has the supply probability storage unit 401, is provided, and the relevant supply probability is stored in the supply probability storage unit 401 in advance, and is provided from this storage unit. Therefore, it is possible to easily change the data supply probability when the system is operated.

EXAMPLES

Below, specific examples will be shown mainly for the above-described third embodiment of the present invention.

Figure 10:
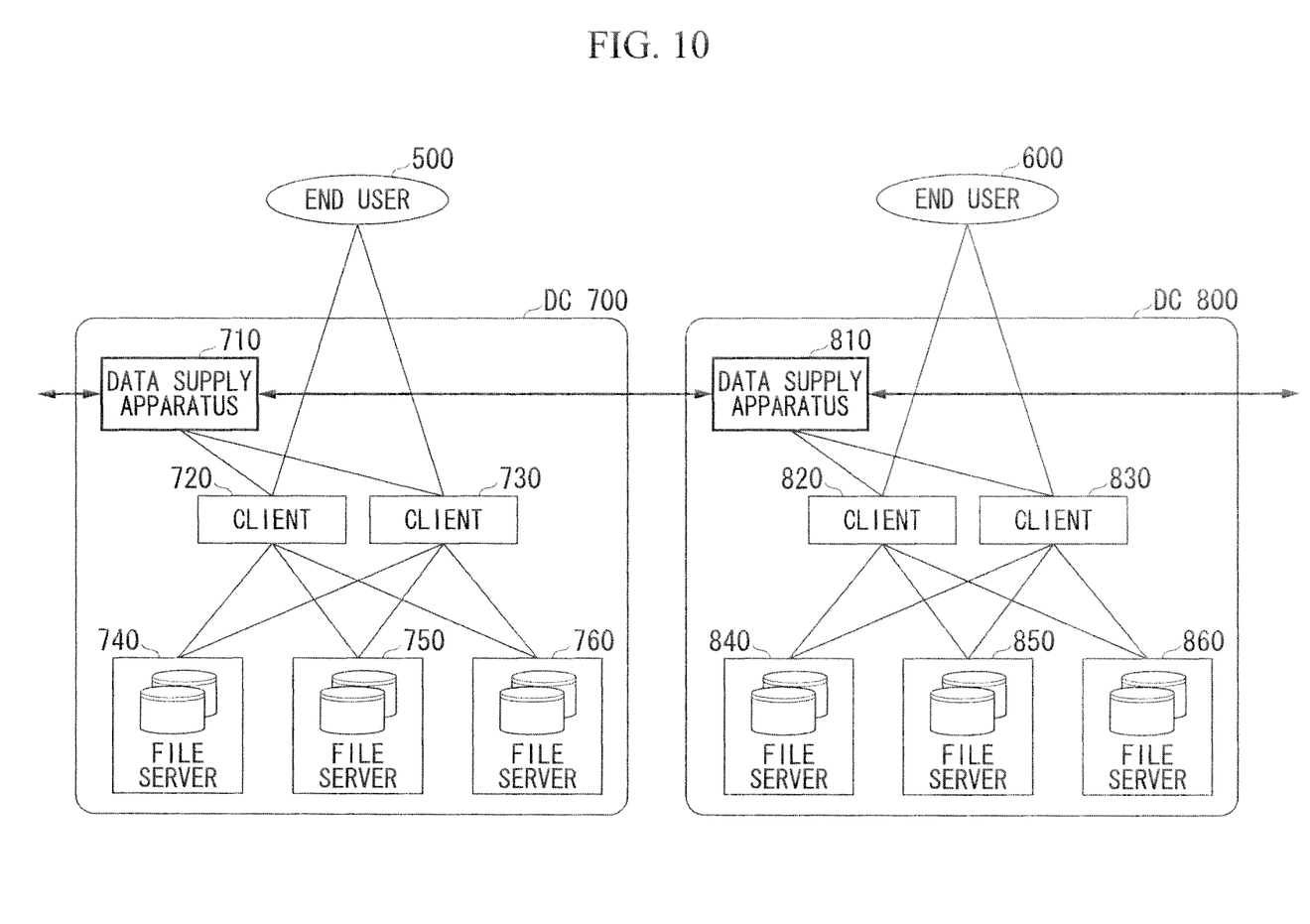
FIG. 10 is a diagram showing a system configuration of a cluster distributed file system as an example structure of a network system which includes the data supply apparatus of the present invention.

FIG. 10 shows the system configuration of a cluster distributed file system as an example structure of a network system which includes the data supply apparatus of the present invention.

The distributed file system of FIG. 10 consists of a DC (data center) 700 (on the server side) connected to an end user 500 and a DC (data center) 800 (on the client side) connected to an end user 600. The DC 700 and the DC 800 are connected via a communication line.

The DC 700 has a data supply apparatus 710 (corresponding to the data supply apparatus in the third embodiment of the present invention) and a file system (on the server side) which includes clients 720 and 730 and file servers 740 to 760.

The DC 800 has a data supply apparatus 810 (corresponding to the data supply apparatus in the third embodiment of the present invention) and a file system (on the client side) which includes clients 820 and 830 and file servers 840 to 860.

In the example of the network system shown in FIG. 10, the DCs 700 and 800 correspond to each DC shown in FIG. 11. In addition, the above-described file system on the server side or the file system on the client side each correspond to the data storage unit 200 (see FIG. 8).

In the structure of the network system shown in FIG. 10, the following operation is generally performed when the end user 600 requests the DC 800 to supply data, and the data is not stored in the file system (on the client side) of the DC 800 but is stored in the file server 740 of the DC 700.

(1) The client 820, which received the relevant data request from the end user 600, detects that the target data is not stored in the file servers 840 to 860 with which the present apparatus directly connects.

(2) The client 820 then detects that the target data is stored in the DC 700, by using an external directory service or the like (3) Accordingly, the client 820 requests the client 720 in the DC 700 to transfer the data.

(4) The client 720 which received the request retrieves the target data from the file server 740, and transfers it to the client 820 (may be to the client 830 as described later) via the data supply apparatus 710 and the data supply apparatus 810.

(5) When receiving the above data from the data supply apparatus 710, the data supply apparatus 810 determined whether or not the data is to be stored, based on a supply probability assigned to the data.

If it is determined that the data is to be stored, the data supply apparatus 810 sends the data via the client 820 or 830 to the file servers 840 to 860, which each store the received data into a storage device managed by the present server.

If it is determined that the data is not to be stored, the data supply apparatus 810 sends the data only to the client 820 or 830.

(6) Lastly, the client 820 or 830 sends the data to the end user 600.

At least part of the operation performed by the structural elements in the data supply apparatus of the present invention is executed by means of computer control. In addition, a program for making a computer execute the above operation based on the procedure shown in the flowcharts of FIGS. 4, 7, and 9 may be distributed by storing the program in a computer-readable storage medium such as a semiconductor memory, a CD-ROM, a magnetic tape, or the like.

The computer, which may be a microcomputer, a personal computer, a general purpose computer, or the like, can retrieve the above program from the above-described storage medium so as to execute the program.

Industrial Applicability

The data supply apparatus in accordance with the present invention can be used in a widely distributed data supply system in a CDN (Contents Delivery Network) or the like, which can be applied to data (e.g., contents) supply or data caching. In particular, the present invention is preferably used when configuring a data supply apparatus and a data supply system suitable for a widely distributed system, by which when supplying data to a destination which is hierarchically connected on a logical network, data supply designation can be simplified, automatic data supply can be performed in response to a demand corresponding to an increase or decrease in the data supply destinations, geographical or temporal data use tendency can be reflected in supply results.

Reference Symbols 100 to 106 data supply apparatus
200 data storage unit
201 data storage determination unit
202 tier number storage unit
203 reception unit
204 transmission unit
302, 401 supply probability storage unit
400 supply probability providing apparatus
402 supply probability obtaining unit

The invention claimed is:

1. A data supply apparatus that supplies data to data supply destinations which are hierarchically connected in a distributed system, wherein the data supply apparatus comprises:
  a transmission device that sends data to another data supply apparatus;
  a reception device that receives data from another data supply apparatus;
  a data storing device that stores data in a storage device; and
  a data storage determination device that determines whether the received data should be stored in the storage device, based on a supply probability for data,
  wherein the supply probability is assigned to each tier of the hierarchical connection.

2. The data supply apparatus in accordance with claim 1, wherein:
  the reception device receives the data to which supply probability information which indicates the supply probability has been appended; and
  the data storage determination device determines whether the received data should be stored in the storage device, based on the supply probability indicated by the supply probability information.

3. The data supply apparatus in accordance with claim 2, further comprising:
  an identification information storage device that stores tier identification information which indicates a tier to which a present apparatus belongs in the hierarchical connection,
  wherein the supply probability information contains the supply probability assigned to each tier, and
  wherein the data storage determination device obtains the tier identification information from the identification information storage device and determines whether the received data should be stored in the storage device, based on the supply probability which is included in the supply probability information and is associated with the tier indicated by the tier identification information.

4. The data supply apparatus in accordance with claim 1, further comprising:
  a supply probability storage device that stores a data supply probability assigned to a present apparatus,
  wherein the data storage determination device determines whether the received data should be stored in the storage device, based on the supply probability stored in the supply probability storage device.

5. The data supply apparatus in accordance with claim 4, wherein:
  the reception device receives the data to which probability control information which indicates a probability control parameter used in a weighting of the supply probability has been appended; and
  the data storage determination device determines whether the received data should be stored in the storage device, based on the probability control parameter and the supply probability for relevant data, which is stored in the supply probability storage device.

6. The data supply apparatus in accordance with claim 4, wherein:
  the supply probability storage device is provided outside the present apparatus.

7. The data supply apparatus in accordance with claim 1, wherein:
  the data storing device is provided as an external apparatus or an external system.

8. A data supply system including a data supply apparatus in accordance with claim 1.

9. A data supply method that supplies data to data supply destinations which are hierarchically connected in a distributed system, wherein the data supply method comprises:
  a transmission step that sends data to an apparatus;
  a reception step that receives data from an apparatus;
  a data storing step that stores data in a storage device; and
  a data storage determination step that determines whether or not the received data should be stored in the storage device, based on a supply probability for data,
  wherein the supply probability is appended to a body of the received data and is assigned to each tier of the hierarchical connection.

10. A non-transitory computer-readable storage medium which stores a computer program for controlling a data supply apparatus that supplies data to data supply destinations which are hierarchically connected in a distributed system, wherein the program comprises:
  a transmission step that sends data to another data supply apparatus;
  a reception step that receives data from another data supply apparatus;
  a data storing step that stores data in a storage device; and
  a data storage determination step that determines whether or not the received data should be stored in the storage device, based on a supply probability for data,
  wherein the supply probability is appended to a body of the received data and is assigned to each tier of the hierarchical connection.

11. The data supply apparatus in accordance with claim 1, wherein data supply destinations are hierarchically connected on a logical network.

12. The data supply apparatus in accordance with claim 1, wherein the supply probability information is predetermined in correspondence to each tier.

13. The data supply apparatus in accordance with claim 1, wherein information related to said supply probability is stored separately from a body of the data.

14. The data supply apparatus in accordance with claim 1, wherein said data supply apparatus and said another data supply apparatus are arranged to form a logical tree having a hierarchical structure.

15. The data supply apparatus in accordance with claim 14, further comprising one or more additional data supply apparatuses,
  wherein said logical tree comprises said one or more additional data supply apparatuses.

16. The data supply apparatus in accordance with claim 2, wherein the supply probability information is appended to the data via the data storage determination unit in response to a user operation of an input device.

17. The data supply apparatus in accordance with claim 1, wherein said data storage determination unit generates random numbers and compares each generated random number with the supply probability, and     wherein when a generated random number is less than or equal to the supply probability, it is determined that relevant data is to be stored in the data storage unit.

18. The data supply apparatus in accordance with claim 1, wherein said distributed system comprises a widely distributed system.

19. The data supply method in accordance with claim 9, wherein said distributed system comprises a widely distributed system.

20. The non-transitory computer-readable storage medium in accordance with claim 10, wherein said distributed system comprises a widely distributed system.

\* \* \* \* \*